United States Patent
Iezzi

(10) Patent No.: US 11,028,287 B2
(45) Date of Patent: Jun. 8, 2021

(54) MOISTURE-CURABLE OMNIPHOBIC COATINGS

(71) Applicant: The Government of the United States of America, as represented by the Secretary of the Navy, Arlington, VA (US)

(72) Inventor: Erick B. Iezzi, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/903,386

(22) Filed: Feb. 23, 2018

(65) Prior Publication Data

US 2019/0031909 A1    Jan. 31, 2019

Related U.S. Application Data

(60) Provisional application No. 62/466,404, filed on Mar. 3, 2017.

(51) Int. Cl.
| | |
|---|---|
| *C09D 183/08* | (2006.01) |
| *C08G 18/38* | (2006.01) |
| *C08G 18/28* | (2006.01) |
| *C08G 18/79* | (2006.01) |
| *C08L 75/02* | (2006.01) |
| *C08G 18/08* | (2006.01) |
| *C08G 18/73* | (2006.01) |
| *C08G 18/83* | (2006.01) |
| *C09D 5/00* | (2006.01) |
| *C09D 175/02* | (2006.01) |
| *C23C 26/00* | (2006.01) |

(52) U.S. Cl.
CPC ....... *C09D 183/08* (2013.01); *C08G 18/0885* (2013.01); *C08G 18/289* (2013.01); *C08G 18/3893* (2013.01); *C08G 18/73* (2013.01); *C08G 18/792* (2013.01); *C08G 18/837* (2013.01); *C08L 75/02* (2013.01); *C09D 5/00* (2013.01); *C09D 175/02* (2013.01); *C23C 26/00* (2013.01); *C08G 2150/00* (2013.01)

(58) Field of Classification Search
CPC .................................................. C09D 183/08
See application file for complete search history.

(56) References Cited

U.S. PATENT DOCUMENTS

| | | |
|---|---|---|
| 6,281,322 B1 | 8/2001 | Groth et al. |
| 2008/0113573 A1 | 5/2008 | Acosta et al. |
| 2009/0176097 A1 | 7/2009 | Brown et al. |
| 2012/0142852 A1 | 6/2012 | Iezzi |
| 2012/0269976 A1* | 10/2012 | Huang ............ C09D 5/1662 427/387 |
| 2015/0299469 A1 | 10/2015 | Takada et al. |
| 2016/0115351 A1 | 4/2016 | Iezzi |
| 2016/0237283 A1* | 8/2016 | Koene .............. C09D 5/00 |
| 2017/0009081 A1 | 1/2017 | Hirokami |

FOREIGN PATENT DOCUMENTS

| | | |
|---|---|---|
| WO | 2015138142 A1 | 9/2015 |
| WO | 2015138156 A1 | 9/2015 |

OTHER PUBLICATIONS

Jordens et al., "Transparent, Abrasion-Resistant Coatings for Metal Substrates" J. Macromol. Sci.—Pure Appl. Chem., A38(2), 185-207 (2001).
Search Report and Written Opinion in PCT/US2018/019418 (dated Jun. 21, 2018).
Cakir et al., "The preparation of UV-cured superhydrophobic cotton fabric surfaces by electrospinning method" Textile Research Journal 2014, vol. 84(14) 1528-1538.
Farbod et al., "Ultrasonic wave effect on PMMA surface, silica nanoparticles assisted erosion" Wear 300 (2013) 105-113.
Search Report in EP18760849.2 (dated Dec. 18, 2020).

* cited by examiner

*Primary Examiner* — Marc S Zimmer
(74) *Attorney, Agent, or Firm* — US Naval Research Laboratory; Joseph T Grunkemeyer

(57) ABSTRACT

An omniphobic material and its method of making by: providing an alkoxysilane-terminated polyurea, and reacting by a moisture-curing reaction the polyurea and a fluorinated material having one or more alkoxy or hydroxyl groups.

34 Claims, 1 Drawing Sheet

MOISTURE-CURABLE OMNIPHOBIC COATINGS

This application claims the benefit of U.S. Provisional Application No. 62/466,404, filed on Mar. 3, 2017. The provisional application and all other publications and patent documents referred to throughout this nonprovisional application are incorporated herein by reference.

TECHNICAL FIELD

The present disclosure is generally related to omniphobic materials.

DESCRIPTION OF RELATED ART

Polyurethane-based topcoats are used to providing visual camouflage, hydrocarbon resistance, flexibility, first-line corrosion resistance, and a host of other properties for military assets. The majority of polyurethane topcoats utilized by the Army, Marine Corps, Navy and Air Force are qualified under MIL-DTL-53039E (Coating, Aliphatic Polyurethane, Single Component, Chemical Agent Resistant), MIL-DTL-64159B (Camouflage Coating, Water Dispersible Aliphatic Polyurethane, Chemical Agent Resistant) or MIL-PRF-85285E (Coating, Polyurethane, Aircraft and Support Equipment), and these topcoats are found on tanks, vehicles, aircraft (fixed and rotary wing) or ground support equipment. However, these polyurethane coatings contain hydrophilic (i.e., water-loving) urethane linkages, which can lead to the uptake of water into the matrix and subsequent hydrolysis of polymer chains, blistering, and/or cracking of the coating. Furthermore, the penetration of moisture through the topcoats, and eventually the underlying primer, leads to substrate corrosion that can render an asset inoperable. These polyurethanes also provide resistance to hydrocarbons, such as lubricating oils and jet-fuels, yet resistance is defined as not significantly softening, whitening, or dulling of the coating, as opposed to preventing the chemicals from entering the matrix where they can off-gas for days after contact.

A coating that provides both hydrophobicity (i.e., water-repelling) and oleophobicity (i.e., oil-repelling) when contacted with water and hexadecane, respectively, would be considered omniphobic, and such coatings should provide enhanced corrosion resistance and repellency of hydrocarbons that contact military assets. To assess the degree of repellency, a contact angle instrument, also known as a goniometer, is utilized to measure the angle between a liquid and the interface of the coating surface. Water or hexadecane angles greater than 90 degrees are considered hydro/oleophobic, angles greater than 110 degrees are considered highly-hydro/oleophobic, and angles greater than 150 degrees are considered superhydro/oleophobic.

Patents by Groth, et. al. (U.S. Pat. No. 6,281,322) and Iezzi (U.S. Pat. No. 9,221,942) describe examples of moisture-curable coatings based on similar polymers, yet neither of these patents describes compositions that include fluorinated additives for generating omniphobic coatings.

BRIEF SUMMARY

Disclosed herein is a method comprising: providing an alkoxysilane-terminated polyurea, and reacting by a moisture-curing reaction the polyurea and a fluorinated material having one or more alkoxy or hydroxyl groups.

Also disclosed herein is a polymer made by the above method.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed are omniphobic moisture-curable coating formulations for providing enhanced corrosion resistance and hydrocarbon repellency for military assets and other equipment. The composition may be made into matte/low-gloss coatings, or semi-gloss and high-gloss coatings.

An alkoxysilane-terminated polyurea is used to make the polymer. The polyurea may be made by reacting an aliphatic polyisocyanate with an amino-functional alkoxysilane. This compound may be monofunctional and may have the formula $NH(R^3)(CH_2)_n Si(R^2)_x (OR^1)_{3-x}$. $R^1$ and $R^2$ are each the same or different alkyl groups, such as methyl or ethyl. $R^3$ may be —H, aryl, alkyl, an ester-containing alkyl, or a fluorinated alkyl group. The value of n is 1, 2, or 3 and x is 0, 1, or 2. One suitable compound is N-butyl-3-aminopropyltrimethoxysilane. The amino groups react with the isocyanate groups to form urea groups. An equal or greater equivalent of amino-functional alkoxysilane relative to the polyisocyanate may be used to leave essentially no unreacted isocyanate groups. Thus, the polyurea is alkoxysilane-terminated.

Figure 2:
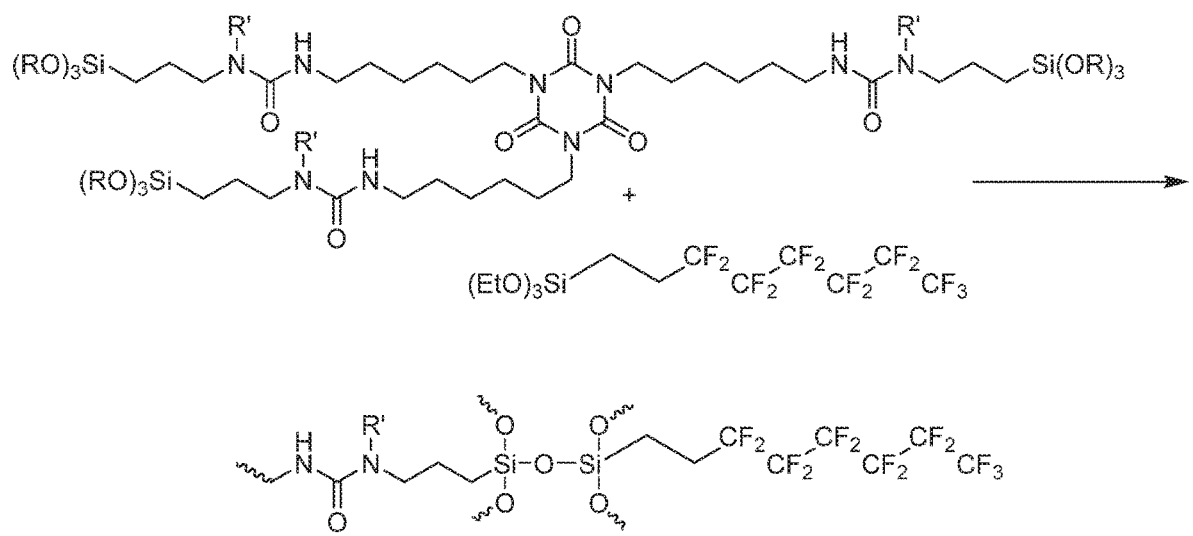
FIG. 2 shows an example of the moisture-curing reaction.

The polyurea is then reacted with a fluorinated material having one or more alkoxy or hydroxyl groups in a moisture-curing reaction. The reaction is exemplified in FIG. 2. The hydroxyl or alkoxy group of the fluorinated material reacts with the alkoxy of the polyurea to join the compounds together. The reaction may include any amount of the fluorinated material, such as up to 50 wt % of the fluorinated material. Depending on the functionality of the compounds, the product may be a linear or crosslinked polymer.

The fluorinated material may be a fluoroalkyl alkoxysilane having the formula $(R^4 O)_3 Si(CX_2)_n CX_3$. Each X is —H or —F including at least one —F, and each $R^4$ is —H or an alkyl group. This compound may include a perfluoroalkyl group. Other possibilities for the fluorinated material include: a reaction product of a fluoroalkyl alkoxysilane and fumed silica, a reaction product of a fluoroalkyl alkoxysilane and a hydroxyl-functional polymeric particle, a fluorinated organic polymer with hydroxyl functionality, and a fluorinated silicone polymer with hydroxyl functionality.

Example fluorinated materials include, but are not limited to, (3,3,3-trifluoropropyl)trimethoxy silane, nonafluorohexyltrimethoxysilane, (tridecafluoro-1,1,2,2-tetrahydrooctyl)triethoxysilane, (tridecafluoro-1,1,2,2-tetrahydrooctyl)

trimethoxysilane, perfluorododecyl-1H,1H,2H,2H-triethoxysilane, perfluorotetradecyl-1H,1H,2H,2H-triethoxysilane, triethoxy(3,3,4,4,5,5,6,6,7,7,8,8,8-tridecafluoro-1-octyl)silane, [perfluoro(polypropyleneoxy)]methoxypropyltrimethoxysilane.

For any of the reactants used, more than one of such reactant may be present in a reaction. The resulting polymer may also include or be combined with any of: a reactive diluent, an alkyl-functional alkoxysilane, tetraethoxysilane, tetramethoxysilane, an alkoxy-functional polysiloxane, an amino-functional alkoxysilane, 3-aminopropyltrimethoxysilane, 3-aminopropyltriethoxysilane, 3-aminopropylmethyldiethoxysilane, N-methyl-3-aminopropyltrimethoxysilane, a catalyst, a filler, a solvent, a pigment, a wetting/dispersing agent, a flow/leveling agent, or a thickening agent. The compounds listed here may help to increase the coating cure-rate, assist with adhesion, and/or reduce viscosity.

The polymer may be coated on a substrate by methods such as a spray, brush, roll, or dip method. The moisture curing may occur after the reactants have been applied to the substrate.

The following examples are given to illustrate specific applications. These specific examples are not intended to limit the scope of the disclosure in this application.

EXAMPLE

Figure 1:
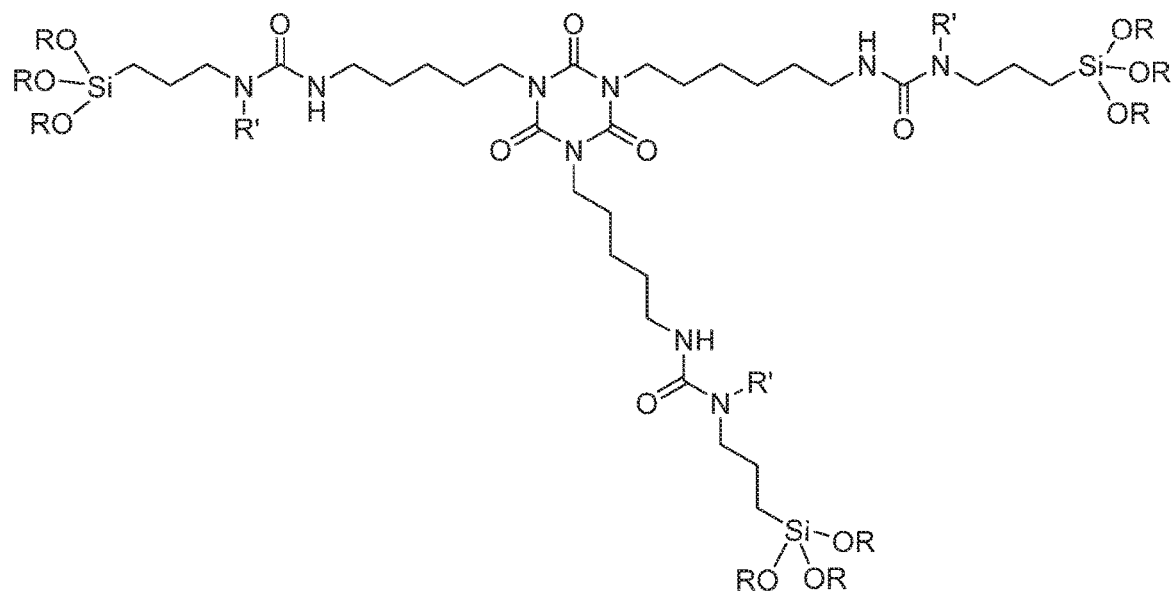
FIG. 1 shows an example of a moisture-curable polymer used in omniphobic coatings.

The amount of 250 g (1.295 equiv.) of an HDI trimer-based isocyanate (Covestro) was dissolved in 292 g of 4-chlorobenzotrifluoride (Aldrich) in a 1 L 4-neck round bottom flask equipped with a nitrogen inlet, mechanical stirrer and thermometer. Next, 12.5 g of vinyltrimethoxysilane (Gelest) was added as a drying agent. Using an addition funnel, 304.91 g (1.295 equiv.) of N-butyl-3-aminopropyltrimethoxysilane (Gelest) was added dropwise to the solution while keeping the temperature at 50-60° C. Once the addition was complete, the reaction was allowed to stir for 60 minutes until all the free isocyanate had been consumed. A representative structure of the polymer is shown in FIG. 1.

The polymer can contain R groups that are methyl, ethyl, butyl, or isopropyl, and the R' group can be hydrogen, aliphatic, cycloaliphatic, aromatic or any combination thereof. Furthermore, the isocyanate can be any aliphatic, cycloaliphatic or aromatic with at least two isocyanate groups.

Omniphobic coatings were formulated by adding 75.76 g of the aforementioned polymer solution to a pint can under a nitrogen blanket, followed by the addition of 15.3 g of titanium dioxide (DuPont). The pigment was then dispersed with a high-speed mixer until homogenous. This was followed by an additional 75.76 g of the polymer solution, 65 g of a polypropylene matting agent, 60 g of methyl amyl ketone (Sigma-Aldrich), 40 g of 4-chlorobenzotrifluoride, 0 to 15 g of triethoxy(3,3,4,4,5,5,6,6,7,7,8,8,8-tridecafluoro-1-octyl)silane (Sigma-Aldrich), and 0.1 g of dibutyltin dilaurate (Sigma-Aldrich). The formulas were then spray-applied on tinplated steel panels via high volume, low pressure (HVLP) spray equipment to achieve matte/low-gloss coatings with a dry film thickness of 2-3 mils (50.8-76.2 microns). The coatings were allowed to cure at ambient conditions (~72° F., 40-50% R.H.) for 1 week before testing.

Table 1 shows the water and hexadecane contact angles of the moisture-curable coatings based on various weight percentages (on total formula) of the fluorosilane additive.

TABLE 1

| Formula # | Wt. % Fluorosilane | Water contact angle | Hexadecane contact angle |
|---|---|---|---|
| 1 | 0 | 120.7 | 0 |
| 2 | 0.3 | 134.7 | 45.7 |
| 3 | 1.48 | 141.7 | 56.7 |
| 4 | 2.92 | 145.0 | 95.3 |
| 5 | 4.32 | 143.2 | 95.8 |

As is shown for formulas 4 and 5, coatings that are both highly-hydrophobic and oleophobic can be generated with 2-5 wt. % of fluorosilane, thus proving that the coatings are omniphobic. The use of alternative fluorinated silanes, fluorinated silica particles, fluoropolymers and other fluorinated additives have also shown to generate omniphobic coatings when utilized in these moisture-curable formulations. Furthermore, the addition of alkyl silanes, such as isooctyl silane, has been found to increase the olephobicity of these formulas.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising a polymer made by a method comprising:
   providing an alkoxysilane-terminated polyurea;
   wherein the alkoxysilane-terminated polyurea is a reaction product of a mixture consisting of an aliphatic polyisocyanate having at least 2 isocyanate groups and an amino-functional alkoxysilane of the formula $NH(R^3)(CH_2)_nSi(R^2)_x(OR^1)_{3-x}$; wherein x is 1, 2, or 3; wherein x is 0, 1, or 2;
   wherein each $R^1$ and $R^2$ is an alkyl group; and
   wherein $R^3$ is aryl, alkyl, an ester-containing alkyl, or a fluorinated alkyl group; and
   reacting by a moisture-curing reaction the polyurea and a fluorinated material having one or more alkoxy or hydroxyl groups.

2. The composition of claim 1;
   wherein the fluorinated material is a fluoroalkyl alkoxysilane having the formula $(R^4O)_3Si(CX_2)_nCX_3$;

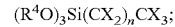

wherein each X is —H or —F;
   wherein at least one X is —F; and
   wherein each $R^4$ is —H or an alkyl group.

3. The composition of claim 2, wherein the fluoroalkyl alkoxysilane comprises a perfluoroalkyl group.

4. The composition of claim 2, wherein the fluoroalkyl alkoxysilane is (3,3,3-trifluoropropyl)trimethoxysilane, nonafluorohexyltrimethoxysilane, (tridecafluoro-1,1,2,2-tetrahydrooctyl)triethoxysilane, (tridecafluoro-1,1,2,2-tetrahydrooctyl)trimethoxysilane, perfluorododecyl-1H,1H,2H,2H-triethoxysilane, perfluorotetradecyl-1H,1H,2H,2H-triethoxysilane, triethoxy(3,3,4,4,5,5,6,6,7,7,8,8,8-tridecafluoro-1-octyl)silane, [perfluoro(polypropyleneoxy)]methoxypropyltrimethoxysilane, or a combination thereof.

5. The composition of claim 1, wherein the fluorinated material is a reaction product of a fluoroalkyl alkoxysilane and fumed silica.

6. The composition of claim 1, wherein the fluorinated material is a reaction product of a fluoroalkyl alkoxysilane and a hydroxyl-functional polymeric particle.

7. The composition of claim 1, wherein the fluorinated material is a fluorinated organic polymer with hydroxyl functionality.

8. The composition of claim 1, wherein the fluorinated material is a fluorinated silicone polymer with hydroxyl functionality.

9. The composition of claim 1, wherein the reaction includes up to 50 wt % of the fluorinated material.

10. The composition of claim 1, further comprising:
a reactive diluent, an alkyl-functional alkoxysilane, tetraethoxysilane, tetramethoxysilane, or an alkoxy-functional polysiloxane.

11. The composition of claim 1, further comprising:
an amino-functional alkoxysilane, 3-aminopropyltrimethoxysilane, 3-aminopropyltriethoxysilane, 3-aminopropylmethyldiethoxysilane, or N-methyl-3-aminopropyltrimethoxysilane.

12. The composition of claim 1, further comprising:
a catalyst, a filler, a solvent, a pigment, a wetting/dispersing agent, a flow/leveling agent, or a thickening agent.

13. The composition of claim 1, further comprising:
a reactive diluent, an alkyl-functional alkoxysilane, tetraethoxysilane, tetramethoxysilane, an alkoxy-functional polysiloxane, a catalyst, a filler, a solvent, a pigment, a wetting/dispersing agent, a flow/leveling agent, or a thickening agent.

14. A method comprising:
providing a composition comprising:
an alkoxysilane-terminated polyurea;
wherein the alkoxysilane-terminated polyurea is a reaction product of a mixture consisting of an aliphatic polyisocyanate having at least 2 isocyanate groups and an amino-functional alkoxysilane of the formula NH(R$^3$)(CH$_2$)$_n$Si(R$^2$)$_x$(OR$^1$)$_{3-x}$; wherein n is 1, 2, or 3; wherein x is 0, 1, or 2;
wherein each R$^1$ and R$^2$ is an alkyl group; and
wherein R$^3$ is aryl, alkyl, an ester-containing alkyl, or a fluorinated alkyl group;
and
a second amino-functional alkoxysilane selected from the group consisting of 3-aminopropyltrimethoxysilane, 3-aminopropyltri ethoxy silane, 3-aminopropylmethyldi ethoxy silane, or N-methyl-3-aminopropyltrimethoxysilane; and
reacting by a moisture-curing reaction the polyurea and a fluorinated material having one or more alkoxy or hydroxyl groups.

15. A method comprising:
providing an alkoxysilane-terminated polyurea;
wherein the alkoxysilane-terminated polyurea is a reaction product of a mixture consisting of an aliphatic polyisocvanate having at least 2 isocyanate groups and an amino-functional alkoxysilane of the formula NH(R$^3$)(CH$_2$)$_n$Si(R$^2$)$_x$(OR$^1$)$_{3-x}$; wherein n is 1, 2, or 3; wherein x is 0, 1, or 2;
wherein each R$^1$ and R$^2$ is an alkyl group; and
wherein R$^3$ is aryl, alkyl, an ester-containing alkyl, or a fluorinated alkyl group; and
reacting by a moisture-curing reaction the polyurea and a fluorinated material having one or more alkoxy or hydroxyl groups.

16. The method of claim 15;
wherein the fluorinated material is a fluoroalkyl alkoxysilane having the formula

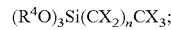

(R$^4$O)$_3$Si(CX$_2$)$_n$CX$_3$;

wherein each X is —H or —F;
wherein at least one X is —F; and
wherein each R$^4$ is —H or an alkyl group.

17. The method of claim 16, wherein the fluoroalkyl alkoxysilane comprises a perfluoroalkyl group.

18. The method of claim 16, wherein the fluoroalkyl alkoxysilane is (3,3,3-trifluoropropyl)trimethoxysilane, nonafluorohexyltrimethoxysilane, (tridecafluoro-1,1,2,2-tetrahydrooctyl)triethoxysilane, (tridecafluoro-1,1,2,2-tetrahydrooctyl)trimethoxysilane, perfluorododecyl-1H,1H,2H,2H-triethoxysilane, perfluorotetradecyl-1H,1H,2H,2H-triethoxysilane, triethoxy(3,3,4,4,5,5,6,6,7,7,8,8,8-tridecafluoro-1-octyl)silane, [perfluoro(polypropyleneoxy)]methoxypropyltrimethoxysilane, or a combination thereof.

19. The method of claim 15, wherein the fluorinated material is a reaction product of a fluoroalkyl alkoxysilane and fumed silica.

20. The method of claim 15, wherein the fluorinated material is a reaction product of a fluoroalkyl alkoxysilane and a hydroxyl-functional polymeric particle.

21. The method of claim 15, wherein the fluorinated material is a fluorinated organic polymer with hydroxyl functionality.

22. The method of claim 15, wherein the fluorinated material is a fluorinated silicone polymer with hydroxyl functionality.

23. The method of claim 15, wherein the reaction includes up to 50 wt % of the fluorinated material.

24. The method of claim 15, further comprising:
applying the alkoxysilane-terminated polyurea and the fluorinated material to a substrate by a spray, brush, roll, or dip method.

25. A coating made by the method of claim 24.

26. The method of claim 14;
wherein the fluorinated material is a fluoroalkyl alkoxysilane having the formula

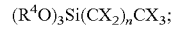

(R$^4$O)$_3$Si(CX$_2$)$_n$CX$_3$;

wherein each X is —H or —F;
wherein at least one X is —F; and
wherein each R$^4$ is —H or an alkyl group.

27. A composition comprising:
a polymer made by a method comprising;
providing an alkoxysilane-terminated polyurea;
wherein the alkoxysilane-terminated polyurea is a reaction product of a mixture consisting of an aliphatic polyisocyanate having at least 2 isocyanate groups and an amino-functional alkoxysilane of the formula NH(R$^3$)(CH$_2$)$_n$Si(R$^2$)$_x$(OR$^1$)$_{3-x}$; wherein n is 1, 2, or 3; wherein x is 0, 1, or 2;
wherein each R$^1$ and R$^2$ is an alkyl group; and
wherein R$^3$ is aryl, alkyl, an ester-containing alkyl, or a fluorinated alkyl group; and
reacting by a moisture-curing reaction the polyurea and a fluorinated material having one or more alkoxy or hydroxyl groups; and an amino-functional alkoxysilane, 3-aminopropyltrimethoxysilane, 3-aminopropyltriethoxysilane, 3-aminopropylmethyldiethoxysilane, or N-methyl-3-aminopropyltrimethoxysilane.

28. The composition of claim 27;
wherein the fluorinated material is a fluoroalkyl alkoxysilane having the formula $(R^4O)_3Si(CX_2)_nCX_3;$ wherein each X is —H or —F;
wherein at least one X is —F; and
wherein each $R^4$ is —H or an alkyl group.

29. The composition of claim 27, wherein the fluorinated material is a reaction product of a fluoroalkyl alkoxysilane and fumed silica, a reaction product of a fluoroalkyl alkoxysilane and a hydroxyl-functional polymeric particle, a fluorinated organic polymer with hydroxyl functionality, or a fluorinated silicone polymer with hydroxyl functionality.

30. The method of claim 14, wherein the fluorinated material is a reaction product of a fluoroalkyl alkoxysilane and fumed silica, a reaction product of a fluoroalkyl alkoxysilane and a hydroxyl-functional polymeric particle, a fluorinated organic polymer with hydroxyl functionality, or a fluorinated silicone polymer with hydroxyl functionality.

31. The method of claim 14, further comprising:
applying the alkoxysilane-terminated polyurea and the fluorinated material to a substrate by a spray, brush, roll, or dip method.

32. A coating made by the method of claim 31.

33. The polymer of claim 1, wherein the aliphatic polyisocyanate is a hexamethylene diisocyanate trimer.

34. The method of claim 15, wherein the aliphatic polyisocyanate is a hexamethylene diisocyanate trimer.

* * * * *

UNITED STATES PATENT AND TRADEMARK OFFICE
CERTIFICATE OF CORRECTION

PATENT NO. : 11,028,287 B2
APPLICATION NO. : 15/903386
DATED : June 8, 2021
INVENTOR(S) : Erick Iezzi It is certified that error appears in the above-identified patent and that said Letters Patent is hereby corrected as shown below:

In the Claims

Claim 1, Column 4, Lines 31-45:
1. A composition comprising a polymer made by a method comprising:
   providing an alkoxysilane-terminated polyurea;
      wherein the alkoxysilane-terminated polyurea is a reaction product of a mixture consisting of an aliphatic polyisocvanate having at least 2 isocyanate groups and an amino-functional alkoxysilane of the formula $NH(R^3)(CH_2)_nSi(R^2)_x(OR^1)_{3-x}$;
      wherein x is 1, 2, or 3; wherein x is 0, 1, or 2;
      wherein each $R^1$ and $R^2$ is an alkyl group; and
      wherein $R^3$ is aryl, alkyl, an ester-containing alkyl, or a fluorinated alkyl group; and
   reacting by a moisture-curing reaction the polyurea and a fluorinated material having one or more alkoxy or hydroxyl groups.

Should be:
1. A composition comprising a polymer made by a method comprising:
   providing an alkoxysilane-terminated polyurea;
      wherein the alkoxysilane-terminated polyurea is a reaction product of a mixture consisting of an aliphatic polyisocyanate having at least 2 isocyanate groups and an amino-functional alkoxysilane of the formula $NH(R^3)(CH_2)_nSi(R^2)_x(OR^1)_{3-x}$; wherein n is 1, 2, or 3; wherein x is 0, 1, or 2;
      wherein each $R^1$ and $R^2$ is an alkyl group; and
      wherein $R^3$ is aryl, alkyl, an ester-containing alkyl, or a fluorinated alkyl group; and
   reacting by a moisture-curing reaction the polyurea and a fluorinated material having one or more alkoxy or hydroxyl groups.

Claim 15, Column 5, Lines 54-67:
15. A method comprising:
   providing an alkoxysilane-terminated polyurea;

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,028,287 B2 wherein the alkoxysilane-terminated polyurea is a reaction product of a mixture consisting of an aliphatic polyisocvanate having at least 2 isocyanate groups and an amino-functional alkoxysilane of the formula $NH(R^3)(CH_2)_nSi(R^2)_x(OR^1)_{3-x}$; wherein n is 1, 2, or 3; wherein x is 0, 1, or 2;

wherein each $R^1$ and $R^2$ is an alkyl group; and wherein $R^3$ is aryl, alkyl, an ester-containing alkyl, or a fluorinated alkyl group; and
reacting by a moisture-curing reaction the polyurea and a fluorinated material having one or more alkoxy or hydroxyl groups.

Should be:

15. A method comprising:

providing an alkoxysilane-terminated polyurea;

wherein the alkoxysilane-terminated polyurea is a reaction product of a mixture consisting of an aliphatic polyisocyanate having at least 2 isocyanate groups and an amino-functional alkoxysilane of the formula $NH(R^3)(CH_2)_nSi(R^2)_x(OR^1)_{3-x}$; wherein n is 1, 2, or 3; wherein x is 0, 1, or 2;

wherein each $R^1$ and $R^2$ is an alkyl group; and wherein $R^3$ is aryl, alkyl, an ester-containing alkyl, or a fluorinated alkyl group; and
reacting by a moisture-curing reaction the polyurea and a fluorinated material having one or more alkoxy or hydroxyl groups.